United States Patent
Vandenberg et al.

(10) Patent No.: US 7,188,268 B2
(45) Date of Patent: Mar. 6, 2007

(54) METHOD AND APPARATUS FOR SYNCHRONOUS LOADING AND OUT-OF-PHASE UNLOADING OF DATA REGISTERS

(75) Inventors: Dennis J. Vandenberg, Placentia, CA (US); Douglas G. Gilliland, Chicago, IL (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 538 days.

(21) Appl. No.: 10/697,424

(22) Filed: Oct. 30, 2003

(65) Prior Publication Data

US 2004/0088596 A1    May 6, 2004

Related U.S. Application Data

(60) Provisional application No. 60/422,329, filed on Oct. 30, 2002.

(51) Int. Cl.
*G06F 1/12* (2006.01)
(52) U.S. Cl. ...................................... 713/400
(58) Field of Classification Search ................ 713/400
See application file for complete search history.

(56) References Cited

U.S. PATENT DOCUMENTS

| | | | | |
|---|---|---|---|---|
| 5,857,005 A | * | 1/1999 | Buckenmaier | 375/357 |
| 5,905,766 A | * | 5/1999 | Nguyen | 375/354 |
| 5,918,042 A | * | 6/1999 | Furber | 713/600 |
| 6,055,285 A | * | 4/2000 | Alston | 375/372 |
| 6,584,536 B1 | * | 6/2003 | Deng | 710/310 |
| 2003/0009644 A1 | * | 1/2003 | Fujii | 711/156 |

* cited by examiner

*Primary Examiner*—Chun Cao
*Assistant Examiner*—Vincent Tran
(74) *Attorney, Agent, or Firm*—Fogg & Powers LLC; Jon M. Powers

(57) ABSTRACT

An output of a first data register is coupled to an input of a second data register. The same periodic clock signal clocks both data registers. A controller monitors the clock signal, a first load signal and a read signal. The controller generates a guard band signal using the clock signal and the first load signal. The controller also generates a second guard band signal from the read signal and the clock signal. A second load signal, that is used to load the second data register, is created by performing a logical AND operation on the two guard band signals.

20 Claims, 3 Drawing Sheets

METHOD AND APPARATUS FOR SYNCHRONOUS LOADING AND OUT-OF-PHASE UNLOADING OF DATA REGISTERS

CROSS REFERENCE TO RELATED APPLICATIONS

This application is related to and claims the benefit under 35 USC 119(e) of Provisional Application Serial No. 60/422,329 (the '329 Application), filed on Oct. 30, 2002. The '329 Application is incorporated by reference

BACKGROUND OF THE INVENTION

Data registers are typically used to store data for later reading. For example, a "D flip-flop", also known as a data register, is presented data at the input. The input data is then loaded on the next clock edge, either rising or falling, depending on the type of register, if the clock enable input is true.

A problem exists with the loading and unloading of a register when the input and output of the register are connected to a source and destination, respectively, that are synchronous and of unknown but relatively constant phase to each other.

One solution to this problem is to use a single register. The problem with this approach is that the unload can occur at any time relative to the load. In this case, the register may be loading at exactly the wrong time as the unloading and, therefore, the register output may have corrupt data. This corrupt data may also be both intermittent and persistent.

Adding a second stage register to the output of the first stage register does not fix this problem. The second stage register could also be loaded at the same time. There is a resulting need for a register apparatus loaded synchronously and unloaded out-of-phase with the loading.

SUMMARY OF THE INVENTION

The present invention encompasses a data register apparatus that can be loaded synchronously and unloaded out-of-phase. The apparatus is comprised of a first data register that has a data input coupled to a data signal, a clock input coupled to a clock signal, an enable input coupled to a periodic first load signal, and a data output.

The apparatus further comprises a second data register that has a data input coupled to the data output of the first data register, a clock input coupled to the clock signal, an enable input coupled to a second load signal, and a data output. In one embodiment, the first and second data registers are "D" type flip-flops.

A controller is coupled to and controls the operation of the first and second data registers. The controller has a clock input coupled to the clock signal, a load data input coupled to the first load signal, and a read data input coupled to a periodic read signal.

The controller has the capability for generating a first guard band signal using the first load signal and the clock signal. The controller also generates a second guard band signal using the read signal and the clock signal. In one embodiment, the controller generates the second load signal by logically ANDing the first and second guard band signals.

DETAILED DESCRIPTION OF THE PREFERRED EMBODIMENT

The data register apparatus of the present invention provides synchronous loading and out-of-phase unloading of input data. This is accomplished by the generation of guard band signals, one for a load signal and another for an unload or read signal, that are logically ANDed to generate a clock enable signal for the apparatus.

Figure 1:
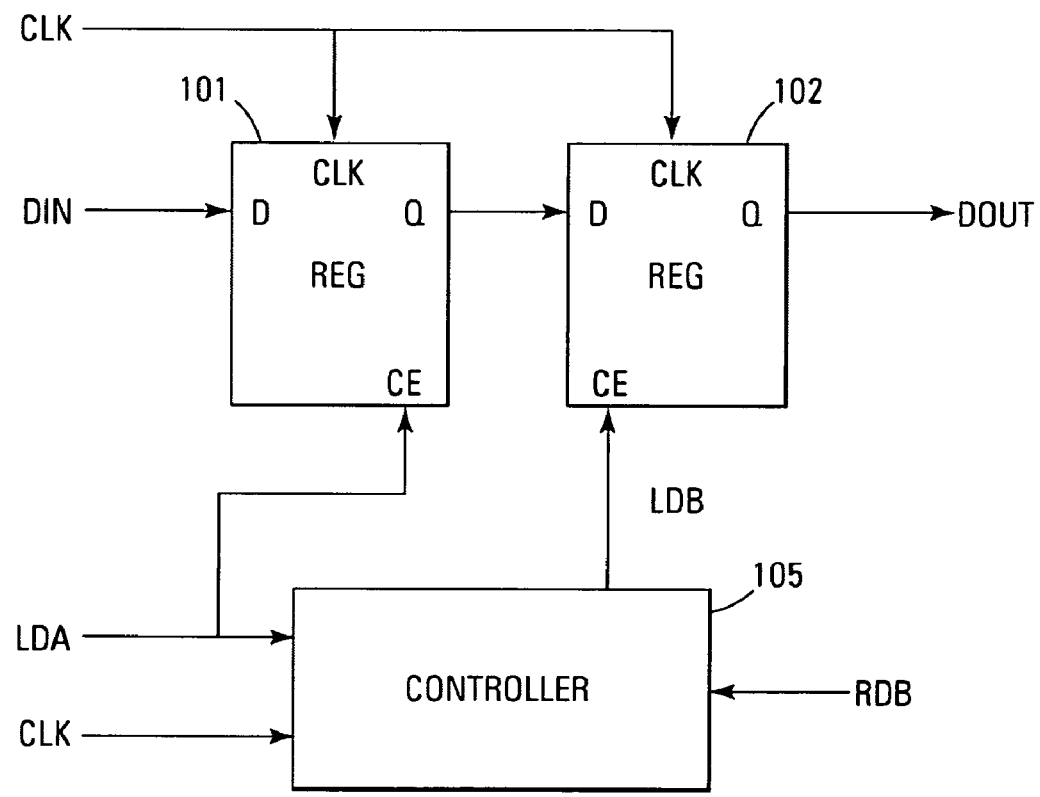
FIG. 1 shows a block diagram of one embodiment of the data register of the present invention.

FIG. 1 illustrates a block diagram of one embodiment of the data register apparatus of the present invention. The apparatus is comprised of a first (101) and a second data register (102). In one preferred embodiment, these data registers (101 and 102) are "D flip-flops". Other embodiments may use other types of flip-flops or registers.

Each data register (101 and 102) is comprised of a data input that is referred to as the "D" input. Data that is to be loaded into a particular register is presented to this input for a predetermined set-up time, typically in the nanosecond range, prior to being loaded. In the embodiment of FIG. 1, the data to be loaded is referred to as DIN.

DIN is loaded into the register with a clock pulse, referred to as CLK in FIG. 1. In one embodiment, the rising edge of the clock pulse latches the data. Other embodiments use the falling edge or simply a logical high or low state.

The clock is applied to the CLK input of each data register (101 and 102). CLK is the clock signal to which the DIN signal is referenced.

CLK of the present invention may be any periodic signal having a predetermined frequency. The present invention is not limited to any particular frequency or duty cycle.

The registers of FIG. 1 are additionally comprised of chip enable inputs that are referred to as CE. In one preferred embodiment, the CE inputs are active high. Alternate embodiments may use active low CE inputs.

The CE inputs are responsible for enabling the CLK inputs. When the signal presented to each register's CE input is true (e.g., a logical high), the CLK input is enabled such that CLK can latch in DIN. When the signal at CE is not true (e.g., a logical low), CLK is ignored.

In one preferred embodiment, the CE signals are provided by signals LDA and LDB. LDA is the load signal for the first register (101) while LDB is the load signal for the second register (102).

LDA is a periodic, active high signal that is generated by input circuitry. In one embodiment, this input circuitry includes a shift register that generates LDA by shifting out a logical high every certain number of clock cycles. The generation of LDB is discussed subsequently with reference to the controller (105) of the present invention.

The registers (101 and 102) are coupled such that the data output, Q, of the first register (101) is coupled to the data input, D, of the second register (102). The output of the apparatus is the Q signal from the second register (102) and is represented as DOUT.

The apparatus of FIG. 1 is additionally comprised of a controller (105) that is responsible for generating the active high load signal for the second register (102). This signal is referred to as LDB.

In one preferred embodiment, the controller (105) of FIG. 1 is a field programmable gate array (FPGA). As is well known in the art, an FPGA is a gate array into which a logic network can be programmed, after its manufacture, using a hardware description language (HDL). An FPGA may be comprised of an array of logic elements, either gates or lookup table RAM, flip-flops, and programmable interconnect wiring.

Alternate embodiments use other types of controllers. For example, one embodiment uses a programmable logic device (PLD), a microcontroller programmed with microcode, a microprocessor, an application specific integrated circuit (ASIC), or discrete logic gates. The present invention is not limited to any one type of controller or controller scheme.

The controller (105) is coupled to the CLK signal, the LDA signal, and a read data bit signal that is referred to in FIG. 1 as RDB. RDB is a periodic, active high signal from output circuitry that is coupled to the output of the data register apparatus of the present invention. In one embodiment, a shift register may generate RDB by shifting out a logical high every predetermined number of clock cycles. RDB is high when the output circuitry desires to read the contents of the data register and load that data into the output circuitry.

The controller (105) of the present invention monitors the LDA, CLK, and RDB signals. These signals are then used by the controller to generate two guard band signals.

The first guard band signal indicates when the first register's (101) output data can be read by the second register (102). The second guard band signal indicates when the second register (102) is not being read. By logically ANDing these two signals, a signal (LDB) is generated that indicates that the output of the first register (101) is stable and the second register's (102) output is not currently being used. This allows the second register (102) to be updated with stable data from the previous stage (101) without corrupting the data to the following stage (102).

Figure 2:
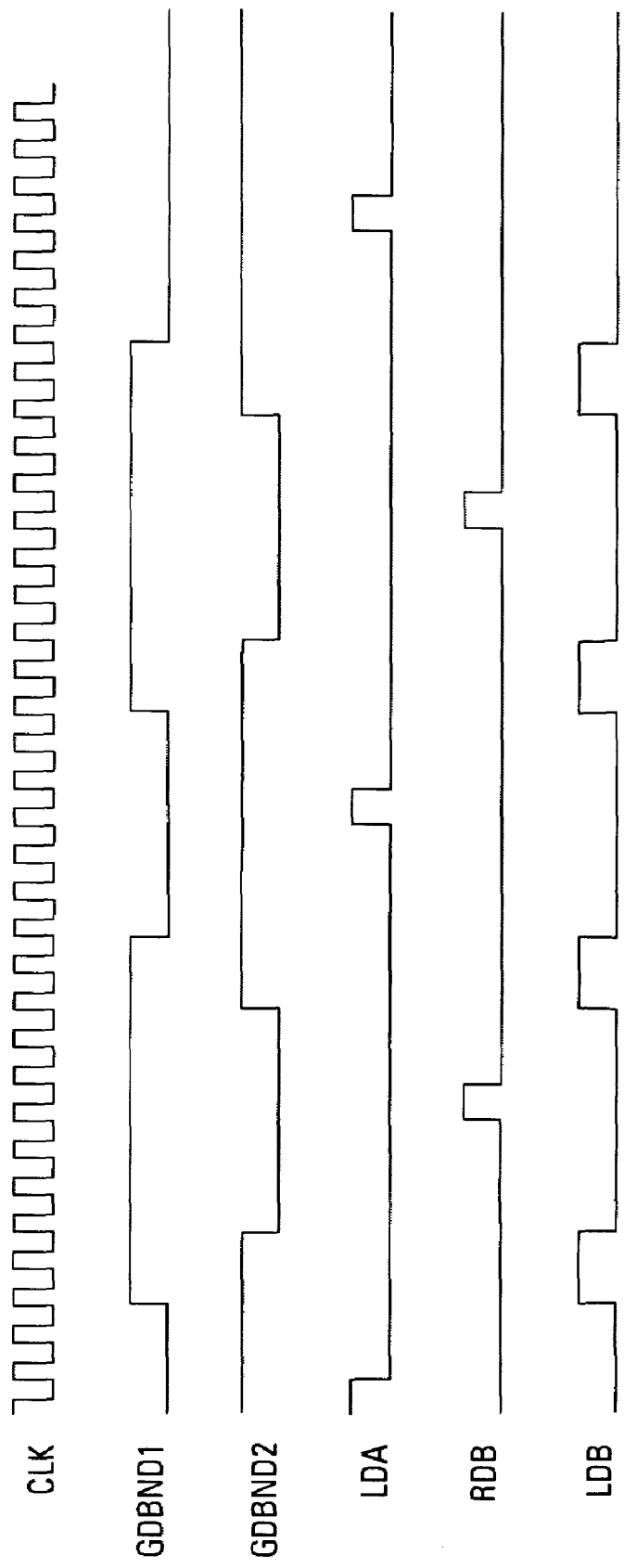
FIG. 2 shows a timing diagram representing the operation of the embodiment illustrated in FIG. 1.

FIG. 2 illustrates a timing diagram of the operation of one embodiment of the controller of the present invention. This timing diagram is for illustration purposes and does not limit the present invention to one particular operation.

The CLK signal is the clock upon which the data register apparatus is based. No particular frequency is shown since the frequency is different for each implementation of the present invention. In one embodiment, CLK is a periodic signal having a frequency of 35 MHz.

The two guard band signals are represented by GDBND1 and GDBND2. GDBND1 is generated from the LDA signal. GDBND2 is generated from the RDB signal.

Since the LDA signal is periodic, the controller of the present invention can generate the GDBND1 signal based on when the next LDA logical high occurs. In the illustrated embodiment, the GNBND1 signal goes low three clock cycles prior to LDA going high. GDBND1 returns high two clock cycles after LDA goes back low.

The length of time that the GDBND1 signal is low can be adjusted depending on the implementation of the data register apparatus of the present invention. If the implementation experiences a greater amount of jitter (i.e., a time based error caused by varying time delays in circuit paths), the duty cycle of GDBND1 can be increased to compensate. For example, the time in clock cycles that the GDBND1 signal is low before and after the LDA signal may be substantially equal.

Since the RDB signal is periodic, the controller of the present invention can generate the GDBND2 signal based on when the next RDB logical high occurs. In the illustrated embodiment, the GNBND2 signal goes low three clock cycles prior to RDB going high. GDBND2 returns high two clock cycles after RDB goes back low.

The length of time that the GDBND2 signal is low can be adjusted depending on the implementation of the data register apparatus of the present invention. If the implementation experiences a greater amount of jitter, the duty cycle of GDBND2 can be increased to compensate. For example, the time in clock cycles that the GDBND1 signal is low before and after the RDB signal may be substantially equal.

LDB is then generated by logically ANDing GDBND1 and GDBND2. The illustrated embodiment shows that LDB goes high for two clock cycles. In alternate embodiments that have different amounts of jitter, LDB will have a different duty cycle. For example, if an implementation has a large amount of jitter, the duty cycle of LDB increases since the duty cycles of both GDBND1 and GDBND2 have increased.

Figure 3:
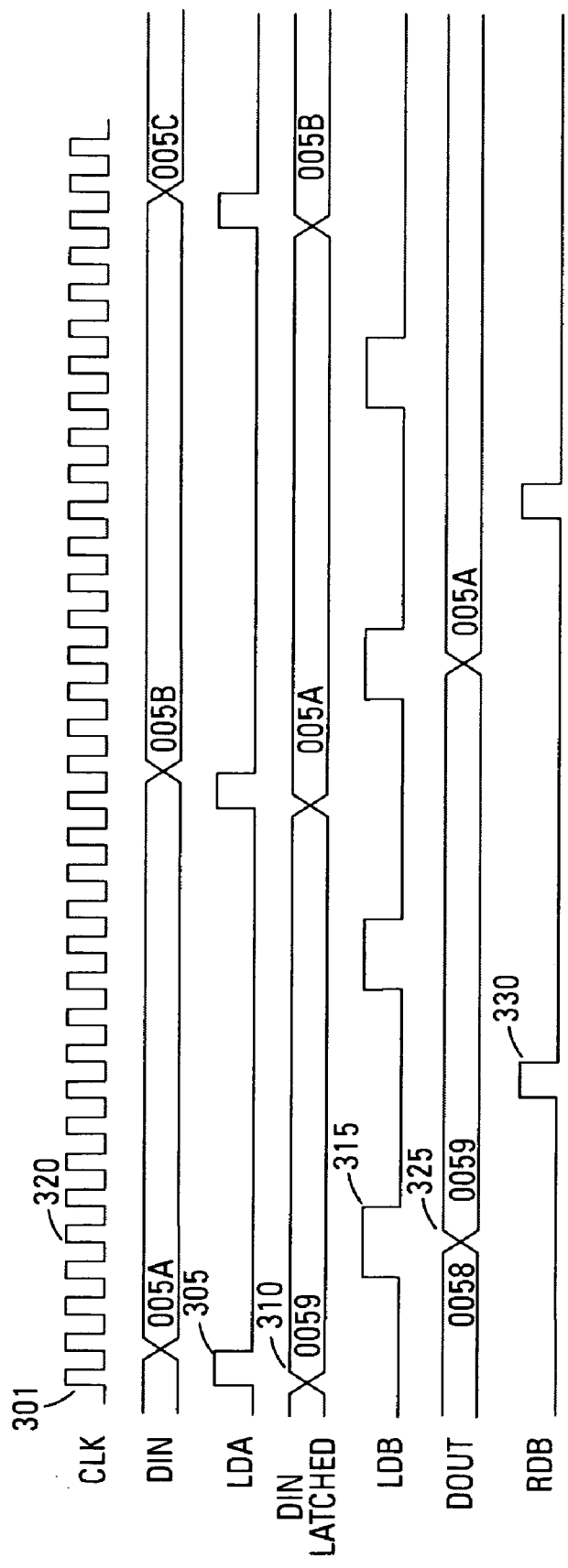
FIG. 3 shows a timing diagram representing the operation of one embodiment of a controller of the present invention.

The use of LDB is illustrated in the timing diagram of FIG. 3. FIG. 3 illustrates a timing diagram of the operation of one embodiment of the data register apparatus of FIG. 1.

The CLK signal is a periodic clock of some predetermined frequency such as 35 MHz. The rising edge of one pulse (301) of this clock signal occurs during a time when LDA is active (305). This causes DIN to be latched (310) into the first stage register as illustrated in FIG. 1. The DIN that is latched is 0059.

The DIN illustrated in FIG. 3 is for illustration purposes only. This data may be accurate for an embodiment that uses a 16-bit circuit that incorporates sixteen of the data register apparatuses of the present invention. Alternate embodiments use from one to an unlimited number of data register apparatuses.

LDB goes high (315) for two clock cycles. During this time, a rising edge of CLK (320) causes the data that was latched into the first stage to be then latched into the second stage. This is then the DOUT of the circuit. In this case, DOUT then becomes 0059 (325).

RDB goes high (330) periodically in order to read the data in the data register apparatus. The operation of this signal was discussed previously.

The signal states of FIG. 3 are for illustration purposes only and do not limit the operation of the present invention. While these signals are shown as being active high, alternate embodiments may use signals that are active low.

In summary, the data register apparatus of the present invention provides the ability to load data synchronously while reading the data out-of-phase. Additionally, the loading clock, LDB, does not have to be a clean signal as required in the prior art. By providing a range of time to read the data instead of a predetermined time, LDB can toggle multiple times per cycle causing reloads of the data register that do not affect the read operation.

The apparatus of the present invention also provides for a high degree of tolerance of jitter between LDA and the reading strobe, RDB. When jitter increases, only the guard band signals need to be made wider.

Numerous modifications and variations of the present invention are possible in light of the above teachings. It is therefore to be understood that within the scope of the appended claims, the invention may be practiced otherwise than as specifically described herein.

What is claimed is:

1. A data register apparatus that can be loaded synchronously and unloaded out-of-phase, the apparatus comprising:
   a first data register comprising a data input coupled to a data signal, a clock input coupled to a clock signal, an enable input coupled to a periodic first load signal, and a data output;
   a second data register comprising a data input coupled to the data output of the first data register, a clock input coupled to the clock signal, an enable input coupled to a second load signal, and a data output; and
   a controller having a clock input coupled to the clock signal, a load data input coupled to the first load signal, and a read data input coupled to a periodic read signal, the controller having a capability for generating a first guard band signal in response to the first load signal and the clock signal and a second guard band signal in response to the read signal and the clock signal, the controller further having a capability for generating the second load signal in response to the first and second guard band signals.

2. The apparatus of claim 1 wherein the second load signal is generated by performing a logical AND operation on the first and second guard band signals.

3. The apparatus of claim 1 wherein the controller has the capability for generating the first guard band signal by creating a logical low for a range of clock cycles that begins a first predetermined quantity of clock cycles prior to the first load signal and ends a second predetermined quantity of clock cycles after the first load signal.

4. The apparatus of claim 1 wherein the controller has the capability for generating the second guard band signal by creating a logical low for a range of clock cycles that begins a first predetermined quantity of clock cycles prior to the first read signal and ends a second predetermined quantity of clock cycles after the first read signal.

5. The apparatus of claim 3 wherein the first predetermined quantity of clock cycles is substantially equal to the second predetermined quantity of clock cycles.

6. The apparatus of claim 4 wherein the first predetermined quantity of clock cycles is substantially equal to the second predetermined quantity of clock cycles.

7. The apparatus of claim 1 wherein the first data register is a "D" type flip-flop.

8. The apparatus of claim 1 wherein the second data register is a "D" type flip-flop.

9. The apparatus of claim 1 wherein the controller is a field programmable gate array.

10. A method for loading a data register apparatus synchronously with a periodic first load signal and unloading the data register apparatus out-of-phase with a read signal, the method comprising:
    coupling an output of a first data register to an input of a second data register;
    coupling a clock signal to a clock input of each of the first and second data registers;
    generating a first guard band signal in response to the clock signal and the first load signal;
    generating a second guard band signal in response to the clock signal and the read signal;
    generating a second load signal in response to the first and second guard band signals; and
    applying the second load signal to an enable input of the second data register.

11. The method of claim 10 wherein generating the first guard band signal comprises creating an active low signal that is low for a first predetermined quantity of clock cycles prior to the first load signal and low for a second predetermined quantity of clock cycles subsequent to the first load signal.

12. The method of claim 10 wherein generating the second guard band signal comprises creating an active low signal that is low for a first predetermined quantity of clock cycles prior to the read signal and low for a second predetermined quantity of clock cycles subsequent to the read signal.

13. The method of claim 10 wherein generating the second load signal comprises logically ANDing the first and the second guard band signals.

14. The method of claim 11 wherein the first and second quantities of clock cycles are substantially equal.

15. The method of claim 12 wherein the first and second quantities of clock cycles are substantially equal.

16. A data register apparatus that can be loaded synchronously and unloaded out-of-phase, the apparatus comprising:
    a first data register comprising a data input coupled to a data signal, a clock input coupled to a periodic clock signal, an enable input coupled to a periodic first load signal, and a data output;
    a second data register comprising a data input coupled to the data output of the first data register, a clock input coupled to the clock signal, an enable input coupled to a second load signal, and a data output; and
    a controller having a clock input coupled to the clock signal, a load data input coupled to the first load signal, and a read data input coupled to a periodic read signal, the controller having a capability for generating a first guard band signal that has a low state a first predetermined quantity of clock cycles prior and a second predetermined quantity of clock cycles subsequent to the first load signal, the controller further having a capability for generating a second guard band signal that has a low state a third predetermined quantity of clock cycles prior and a fourth predetermined quantity of clock cycles subsequent to the read signal, the controller further having a capability for generating the second load signal by performing a logical AND operation on the first and second guard band signals.

17. The apparatus of claim 16 wherein the first and second guard bands are periodic.

18. In a controller, a method for loading a data register apparatus synchronously with a periodic first load signal and unloading the data register apparatus out-of-phase with a read signal, the apparatus comprising a first data register having an output coupled to an input of a second data register, both data registers being clock by a periodic clock signal, the method comprising:
    generating a first guard band signal that is low for a first predetermined quantity of clock cycles prior and a second predetermined quantity of clock cycles subsequent to the first load signal;
    generating a second guard band signal that is low for a third predetermined quantity of clock cycles prior and a fourth predetermined quantity of clock cycles subsequent to the read signal; and
    generating a second load signal by logically ANDing the first and second guard band signals.

19. The method of claim 18 and further including coupling the second load signal to an enable input of the second data register.

20. The method of claim 18 wherein the controller is a field programmable gate array.

* * * * *